United States Patent Office 3,293,141
Patented Dec. 20, 1966

3,293,141
FERMENTATION PROCESS FOR PRODUCING L-TRYPTOPHAN
Richard I. Mateles, Brookline, Mass., and Peter G. Lim, Wilmington, Del., assignors to Massachusetts Institute of Technology, Cambridge, Mass., a corporation of Massachusetts
No Drawing. Filed Apr. 20, 1964, Ser. No. 361,284
18 Claims. (Cl. 195—29)

This invention relates to an improved fermentation process for the production of L-tryptophan and in particular to an improved batcerial fermentation process which enables L-tryptophan to be produced in quantities substantially in excess of those obtainable from presently available bacterial fermentation processes.

L-tryptophan is an essential amino acid of great nutritional significance. Its presence is necessary in the human body for proper growth, maintenance, tissue repair, and reproduction, and provides a starting point for the biochemical reactions which result in protein synthesis. L-tryptophan is produced in the body during the process of digestion through the hydrolysis of food proteins of either animal or plant origin. When the body is deprived of protein foods, there results a deficiency in the essential amino acids, including L-tryptophan, with consequent severe bodily deterioration.

Synthetic production of the essential amino acids by biological fermentation processes outside of the body has not been successful for the most part because bacteria do not accumulate this end product in significant quantities. The explanation for this lies in the fact that the bacterial cells limit the production of the amino acids to the amounts required by the cells for incorporation into protein; thus, no accumulation occurs. This problem has been attacked with some success in the production of several amino acids through the use of bacterial mutants which generally produce the desirable L-isomers. However, L-tryptophan has heretofore never been produced and accumulated by bacteria in commercially significant amounts.

It is, therefore, an object of this invention to provide a process for the production of L-tryptophan by bacterial synthesis.

More specifically, it is an object of the present invention to provide a fermentation process for the production of L-tryptophan which will overcome the natural rate-limiting propensities of the essential amino acid-producing bacteria with the resultant accumulation of L-tryptophan in commercially significant amounts.

It is likewise an object of this invention to provide a process for the production of L-tryptophan in sufficient quantities to make this amino acid available for use as a food supplement.

A further object of this invention is to provide a bacterial mutant which lacks the biological controls that prevent the accumulation of L-tryptophan.

Other objects of this invention will be apparent from the detailed description which follows.

It has been observed that two biological controls exist which prevent the accumulation of the essential amino acids by the microorganisms which synthesize them. The first of these controls is known as "repression," in which the accumulation of the end-product inhibits the further synthesis of some or all of the enzymes which carry out the synthesis. Secondly, "feedback inhibition" is involved, in which the end product inhibits the action of an enzyme in the betabolic pathway of the synthesis. In both repression and feedback inhibition, the end-product interferes in some way with the metabolic pathway leading to its own synthesis and, therefore, it does not accumulate. The result of this is that heretofore no bacterial process was available for the production and accumulation of L-tryptophan.

It has been discovered that by physiologically and genetically manipulating certain strains of Escherichia coli so that the biological pathways to the essential amino acids are disturbed, there results a surprising increase in L-tryptophan production over that which is normally produced. This invention provides means for physiologically and genetically derepressing mutants of Escherichia coli allowing, thereby, the synthesis of the enzymes necessary for the reaction to proceed with the resultant production and accumulation of L-tryptophan. This invention also provides procedures for the selection of genetically derepressed mutants of Escherichia coli.

Escherichia coli T3 and T3a are anthranilic acid auxotrophs which are unable to synthesize anthranilic acid, an intermediate in tryptophan biosynthesis, because of the absence of an enzyme in the metabolic pathway due to mutation. Escherichia coli T3 is isolated by the method of Yanofsky (C. Yanofsky. J. Biol. Chem. 217, p. 345, 1955, and J. Biol. Chem. 224, p. 783, 1957) and Escherichia coli T3a by the method of Burns et al. (R. O. Burns and R. D. De Moss, Biochim. Biophys. Acta. 65, p. 233, 1962). These organisms are able to grow only in the presence of L-tryptophan, L-tryptophan containing mixtures such as enzymatic protein hydrolyzates and yeast extracts, or compounds which they can convert into L-tryptophan, such as anthranilic acid or indole. If such compounds are added in growth-limiting amounts (amounts sufficiently small so that the amount of growth is limited by the amount added) it is possible to physiologically derepress the enzymes intermediate anthranilic acid and tryptophan. A nutrient is growth-limiting as long at its addition to a growth medium results in an increase in bacetrial growth. If a plot is made of bacterial growth vs. amount of nutrient added, the range in which the nutrient is growth-limiting corresponds to that portion of the curve which indicates an increase in bacterial growth. Typically, growth increases with the addition of nutrient to a point where it levels off and remains constant irrespective of the amount of nutrient added thereafter.

Derepression results in an increase in the amount of enzyme present to a level many times that normally present. These enzymes have the potential to convert added anthranilic acid or indole into L-tryptophan. If anthranilic acid is then added to the enzyme-containing cell suspension preferably at the time of maximum cell concentration, it will be converted into L-tryptophan which will accumulate.

Both Escherichia coli T3 and T3a will produce the enzymes to convert anthranilic acid into L-tryptophan if growth-limiting amounts of anthranilic acid are added. However, Escherichia coli T3 produces, in the presence of excess tryptophan, the enzyme tryptophanase which degrades tryptophan to indole, pyruvic acid and ammonia. This degradation is undersirable if tryptophan is the desired end product. To prevent the synthesis of tryptophanase, an inhibitor of protein synthesis, such as chloroamphenicol, is added with the anthranilic acid to the enzyme system substrate. Escherichia coli T3a, on the other hand, is a genetically modified mutant which is incapable of synthesizing the enzyme tryptophanase. This eliminates the need for the addition of an inhibitor of protein synthesis during the accumulation of L-tryptophan.

Genetically derepressed mutants of Escherichia coli T3 and T3a which are unable to synthesize anthranilic acid may be selected for use in producing L-tryptophan by growing these strains in a continuous culture on growth-limiting concentrations of anthranilic acid. Under the aforesaid conditions any spontaneous mutants which arise which have an enhanced ability to convert anthranilic acid into L-tryptophan will grow faster than the repressed bacterial population until they constitute the majority of the population. At this point the culture is stopped and the cells are plated out with the desirable mutants being recovered. These faster-growing mutants are genetically derepressed and produce a higher level of enzymes in the biochemical pathway between anthranilic acid and tryptophan. The genetically derepressed mutants produce enzymes independently of the amount of anthranilic acid or tryptophan in the culture broth because of their inability to control this production. These mutants can then be cultured with an added amount of anthranilic acid and L-tryptophan will accumulate in the broth.

The foregoing discussion of L-tryptophan production by mutant strains of Escherichia coli has concerned a combination of genetic and physiological manipulations which achieve derepression. A new mutant strain of Escherichia coli which is called Escherichia coli E971 has been isolated (P. G. Lim and R. I. Mateles, Science 140, p. 388, 1963). This organism is derepressed solely through genetic manipulation and produces L-tryptophan as a result of de novo synthesis rather than through the conversion of an intermediate. Escherichia coli E971 is a mutant strain of Escherichia coli K12 which is subjected to ultraviolet radiation and then plated on modified M–63 agar (A. B. Pardee et al., J. Mol. Biol. 1, 165, 1959) containing 10 mg. of 5-methyltryptophan and 2.0 g. of glucose per liter. The mutant with the greatest activity of tryptophan synthetase was treated again with ultraviolet radiation and plated on modified M–63 agar containing 300 mg. of anthranilic acid per liter.

The resulting doubly resistant mutant fed an auxotroph of Escherichia coli that responded to either indole or tryptophan; it did not feed an auxotroph which responded only to tryptophan. Treatment of the doubly resistant mutant with ethylmethanesulfonate (EMS) by the addition of 0.03 ml. per 2 ml. of culture produced mutants which would feed the tryptophan-responding auxotroph. When the EMS-produced mutant, E–971, chosen because of its large zone of feeding, was grown while being shaken at 37° C. on M–63 broth containing glycerol, an indole concentration of 300 mg. per liter resulted after 20 hours of incubation. The final turbidity of the culture was 350 Klett units with a 640 m$\mu$ filter. Approximately 50 mg. per liter of tryptophan were also present at this time.

The following examples are given as illustrative of this invention only and not as a limitation, as many variations are possible to those skilled in the art without departing from the scope and spirit thereof.

*Example I*

A loopful of cells of Escherichia coli T3 from a slant of Nutrient Agar was inoculated into 100 ml. of M–63 medium supplemented with 2.5 mgm. of anthranilic acid/ml. and incubated over night with shaking at 37° C. The optical density of such a culture was approximately 150 Klett units. At this time, sodium anthranilate (1 mgm./ml.) and chloramphenicol (5 $\mu$ gm./ml.) were added and incubation was continued for another nine hours. At the conclusion of this second incubation period, approximately 150 milligrams of tryptophan per liter of medium were found, as estimated by the chemical assay method of Dickman and Crockett (J. Biol. Chem. 220, p. 957, 1956).

Note: M–63 medium contains, per liter: $K_2HPO_4$, 7.0 gm.; $KH_2PO_4$, 3.0 gm.; $(NH_4)_2SO_4$, 2.0 gm.;

$MgSO_4 \cdot 7H_2O$ 0.25 gm.; $FeSO_4 \cdot 7H_2O$, 0.0005 gm., and glucose, 2.0 gm. or glycerol, 2.0 gm.

*Example II*

Three liters of sterile M–63 medium as in Example I, supplemented with 15 grams of glycerol per liter, 2.5 mgm. of anthranilic acid (neutralized) per liter, and 1 drop of P–2000 antifoam per liter, and inoculated with 1 ml. of an overnight culture of Escherichia coli T3a were placed in a 5 liter fermentor equipped with means for agitation and aeration, and the latter immersed in a water bath at 30° C. The fermentor was aerated at 0.5 vol. air per vol. medium per minute and agitated at 300 r.p.m. After 16 hours, 1 gram of anthranilic acid (neutralized) per liter was added. Since the mutant strain Escherichia coli T3a was used which does not produce the enzyme tryptophanase, the production of tryptophan was accomplished without the necessity of adding chloramphenicol or other inhibitors of protein synthesis. Incubation was allowed to continue for another 24 hours. At this time the fermentation was terminated and analyzed. By chemical analysis, as in Example I, the broth assayed 200 mgm. of tryptophan per liter. By bioassay, using *Leuconostoc mesenteroides* P–60 as the test organism, and standard procedures, the broth assayed 230 mgm. of L-tryptophan per liter.

Table I demonstrates the effect of pH during the growth and production phases on the yield of tryptophan in the broth. Growth is achieved using complex sources of tryptophan, rather than anthranilic acid as in Examples I and II.

TABLE I

| Example | 1 | 2 | 3 | 4 | 5 | 6 | 7 | 8 | 9 |
|---|---|---|---|---|---|---|---|---|---|
| pH at start of growth | 6.0 | 6.0 | 6.0 | 7.0 | 7.0 | 7.0 | 8.0 | 8.0 | 8.0 |
| Growth at end of growth phase Klett U | 425 | 425 | 425 | 485 | 485 | 485 | 420 | 420 | 420 |
| pH adjusted to, at time of anthranil. addition | 6.0 | 7.0 | 8.0 | 6.0 | 7.0 | 8.0 | 6.0 | 7.0 | 8.0 |
| Tryptophan, mgm./liter | 70 | 480 | 368 | 302 | 435 | 297 | 147 | 562 | 365 |

The following procedure was used in Table I: A loopful of cells of Escherichia coli T3a was inoculated into 100 ml. of M–63 medium as in Example I and supplemented with 2.5 mgm. of anthranilic acid per liter. This cell suspension was incubated on a shake table overnight at 30° C. Then, 1 ml. of this culture was used as inoculum to inoculate flasks containing 50 ml. of the folowing medium: glycerol, 15.0 gm./liter; $K_2HPO_4$, 7.0 gm./liter; $KH_2PO_4$, 3.0 gm./liter; $MgSO_4 \cdot 7H_2O$, 0.25 gm./liter; $(NH_4)_2SO_4$, 2.5 gm./liter; $FeSO_4 \cdot 7H_2O$, 0.005 gm./liter; yeast extract, 3.0 gm./liter. The medium was adjusted to the appropriate pH with sulfuric acid or sodium hydroxide solution. The inoculated flasks were shaken for 18 hours at 30° C. at which time growth was measured, the pH readjusted to the pH appropriate for tryptophan production, and 1 gm. of anthranilic acid (as its sodium salt) added per liter of medium. Incubation was continued for 24 hours, at which time the concentration of tryptophan was determined chemically by the method of Dickman and Crockett (J. Biol. Chem. 220, p. 957, 1956).

We claim:

1. A process for the production of L-tryptophan which comprises preparing an enzyme containing cell suspension by culturing under submerged aerobic conditions at a pH of from about 6.0 to about 8.0 at a temperature in the range from 25° C. to 40° C. Escherichia coli T3a on a nutrient medium containing a growth-limiting amount of at least one of the group consisting of anthranilic acid, indole, and L-tryptophan, and adding to said cell suspension an amount of anthranilic acid in excess of that required for bacterial growth whereby L-tryptophan is accumulated.

2. A process for the production of L-tryptophan which comprises preparing an enzyme containing cell suspension by culturing under submerged aerobic conditions at a pH of from about 6.0 to about 8.0 at a temperature in the range from 25° C. to 40° C. Escherichia coli T3 on a nutrient medium containing a growth-limiting amount of at least one of the group consisting of anthranilic acid, indole, and L-tryptophan, and adding to said cell suspension an amount of anthranilic acid in excess of that required for bacterial growth and an inhibitor of protein synthesis whereby L-tryptophan is accumulated.

3. A process for the production of L-tryptophan which comprises preparing an enzyme-containing cell suspension by culturing under submerged aerobic conditions at a pH of from about 6.0 to about 8.0 at a temperature in the range from 25° C. to 40° C. Escherichia coli T3 on a nutrient medium containing a growth-limiting amount of at least one of the group consisting of anthranilic acid, indole, and L-tryptophan, and adding to said cell suspension an amount of indole in excess of that required for bacterial growth and an inhibitor of protein synthesis whereby L-tryptophan is accumulated.

4. A process for the production of L-tryptophan which comprises preparing an enzyme-containing cell suspension by culturing under submerged aerobic conditions at a pH of from about 6.0 to about 8.0 at a temperature in the range from 25° C. to 40° C. Escherichia coli T3 on a nutrient medium to which has been added a growth-limiting amount of anthranilic acid and adding to said cell suspension an amount of indole in excess of that required for bacterial growth and an inhibitor of protein synthesis whereby L-tryptophan is accumulated.

5. A process for the production of L-tryptophan which comprises preparing an enzyme-containing cell suspension by culturing under submerged aerobic conditions at a pH of from about 6.0 to 8.0 at a temperature in the range from 25° C. to 40° C. Escherichia coli T3a on a nutrient medium containing a growth limiting amount of anthranilic acid, and adding to said cell suspension an amount of anthranilic acid in excess of that required for bacterial growth whereby L-tryptophan is accumulated.

6. A process for the production of L-tryptophan which comprises preparing an enzyme-containing cell suspension by culturing under submerged aerobic conditions at a pH of from about 6.0 to 8.0 at a temperature in the range from 25° C. to 40° C. Escherichia coli T3 on a nutrient medium containing a growth-limiting amount of anthranilic acid in excess of that required for bacterial growth and an inhibitor of protein synthesis whereby L-tryptophan is accumulated.

7. The process as in claim 6 wherein the inhibitor of protein synthesis is chloramphenicol.

8. A process for the production of L-tryptophan which comprises preparing an enzyme-containing cell suspension by culturing under submerged aerobic conditions at a pH of from about 6.0 to about 8.0 at a temperature in the range from 25° C. to 40° C. an anthranilic acid auxotroph of Escherichia coli T3a on a nutrient medium which contains a growth-limiting amount of anthranilic acid, and adding to said cell suspension an amount of anthranilic acid in excess of that required for bacterial growth whereby L-tryptophan is accumulated.

9. A process for the production of L-tryptophan which comprises preparing an enzyme-containing cell suspension by culturing under submerged aerobic conditions at a pH of from about 6.0 to about 8.0 at a temperature in the range from 25° C. to 40° C. Escherichia coli T3 on a nutrient medium which contains a growth-limiting amount of anthranilic acid, and adding to said cell suspension an amount of anthranilic acid in excess of that required for bacterial growth and an inhibitor of protein synthesis whereby L-tryptophan is accumulated.

10. The process as in claim 9 wherein the inhibitor of protein synthesis is chloramphenicol.

11. A process for the production of L-tryptophan which comprises preparing an enzyme-containing cell suspension by culturing under submerged aerobic conditions Escherichia coli T3a on a nutrient medium which contains a growth-limiting amount of anthranilic acid, and adding to said cell suspension an amount of anthranilic acid in excess of that required for bacterial growth whereby L-tryptophan is accumulated.

12. A process for the production of L-tryptophan which comprises preparing an enzyme-containing cell suspension by culturing under submerged aerobic conditions Escherichia coli T3 on a nutrient medium which contains a growth-limiting amount of anthranilic acid, and adding to said cell suspension an amount of anthranilic acid in excess of that required for bacterial growth and an inhibitor of protein synthesis whereby L-tryptophan is accumulated.

13. A process for the production of L-tryptophan which comprises culturing under submerged aerobic conditions a mutant of Escherichia coli in which synthesis of enzymes involved in tryptophan biosynthesis have been genetically derepressed on a growth supporting nutrient medium containing an amount of carbohydrate and nitrogen-containing compounds in excess of that required for bacterial growth whereby L-tryptophan is accumulated.

14. A process for the production of L-tryptophan which comprises culturing under submerged aerobic conditions at a pH of from about 6.0 to 8.0 at a temperature in the range from 25° C. to 40° C. a mutant of Escherichia coli in which synthesis of enzymes involved in tryptophan biosynthesis have been genetically derepressed on a growth supporting nutrient medium containing an amount of carbohydrate and nitrogen-containing compounds in excess of that required for bacterial growth whereby L-tryptophan is accumulated.

15. A process for the production of L-tryptophan which comprises culturing under submerged aerobic conditions at a pH of from about 6.0 to about 8.0 at a temperature in the range from 25° C. to 40° C. Escherichia coli E971 on a growth supporting nutrient medium containing an amount of carbohydrate and nitrogen-containing compounds in excess of that required for bacterial growth whereby L-tryptophan is accumulated.

16. A process for the production of L-tryptophan which comprises preparing an enzyme-containing cell suspension by culturing in the absence of tryptophanase under submerged aerobic conditions an anthranilic acid auxotroph of Escherichia coli on a nutrient medium containing a growth-limiting amount of at least one of the group consisting of anthranilic acid, indole, and L-tryptophan, to produce enzymes involved in tryptophan synthesis in excess of the amounts normally present, and thereafter adding to said cell suspension an amount of indole or anthranilic acid in excess of that required for bacterial growth and incubating said suspension still in the absence of tryptophanase until an accumulation of L-tryptophan is present.

17. The process defined by claim 16 wherein the anthranilic acid auxotroph of Escherichia coli is tryptophanase negative.

18. The process defined by claim 16 wherein the incubation of the Escherichia coli is carried out in the presence of an inhibitor for protein synthesis whereby the formation of tryptophanase is prevented.

References Cited by the Examiner

Eisenstein, R. B., et al.: Journal of Bacteriology, January 1962, vol. 83, pp. 193–204.

Yanofsky, C.: Journal of Biological Chemistry, vol. 217, November-December 1955, pp. 345–353.

Yanofsky, C.: Bacteriological Reviews, June 1960, vol. 24, pp. 221–245.

A. LOUIS MONACELL, *Primary Examiner.*

L. M. SHAPIRO, *Assistant Examiner.*